(12) United States Patent
Nakamori et al.

(10) Patent No.: US 8,731,558 B2
(45) Date of Patent: May 20, 2014

(54) MOBILE STATION, RADIO BASE STATION, AND MOBILE COMMUNICATION METHOD

(75) Inventors: Takeshi Nakamori, Yokohama (JP); Hiroyuki Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 184 days.

(21) Appl. No.: 13/058,139

(22) PCT Filed: Jul. 28, 2009

(86) PCT No.: PCT/JP2009/063374
§ 371 (c)(1),
(2), (4) Date: May 4, 2011

(87) PCT Pub. No.: WO2010/016407
PCT Pub. Date: Feb. 11, 2010

(65) Prior Publication Data
US 2011/0207414 A1  Aug. 25, 2011

(30) Foreign Application Priority Data

Aug. 8, 2008  (JP) ................................. 2008-206288

(51) Int. Cl.
*H04W 36/00* (2009.01)
*H04W 72/00* (2009.01)
*H04B 17/00* (2006.01)

(52) U.S. Cl.
USPC .......................... 455/436; 455/450; 455/67.11

(58) Field of Classification Search
USPC ............... 455/436, 67.11, 450, 423, 425, 458
See application file for complete search history.

(56) References Cited

U.S. PATENT DOCUMENTS

| 8,121,634 | B2 | 2/2012 | Aoyama et al. | |
|---|---|---|---|---|
| 2007/0129017 | A1* | 6/2007 | Dalsgaard et al. | 455/67.11 |
| 2008/0090573 | A1* | 4/2008 | Kim et al. | 455/436 |
| 2008/0160918 | A1* | 7/2008 | Jeong et al. | 455/67.11 |
| 2009/0186614 | A1* | 7/2009 | Aoyama et al. | 455/436 |
| 2009/0264132 | A1 | 10/2009 | Tajima et al. | |
| 2010/0120429 | A1* | 5/2010 | Kazmi et al. | 455/436 |
| 2010/0130214 | A1* | 5/2010 | Ahluwalia | 455/450 |

FOREIGN PATENT DOCUMENTS

| WO | 2008/001726 A1 | 1/2008 |
|---|---|---|
| WO | 2008/090592 A1 | 7/2008 |

OTHER PUBLICATIONS

Notice of Grounds for Rejection for Japanese Patent Application No. 2008-206288 mailed Jun. 26, 2012, with English translation thereof (4 pages).
Nokia Corporation, et al., "Measurement configuration and reporting for E-UTRAN," 3GPP TSG-RAN WG2 Meeting 60bis, Agenda item 5.2.1.7, R2-080160, Jan. 14, 2008, 4 pages.

(Continued)

*Primary Examiner* — Andrew Wendell
*Assistant Examiner* — Cindy Trandai
(74) *Attorney, Agent, or Firm* — Osha Liang LLP

(57) ABSTRACT

A mobile station UE includes: a measuring unit which measures the radio quality in a serving cell and a peripheral cell from a radio base station eNB; and a determining unit which determines whether to notify the measurement result. When the mobile station UE is in the discontinuous reception state, the determining unit determines whether to notify the measurement result in accordance with the radio quality in the measured serving cell and the peripheral cell and a parameter for the discontinuous reception state. When the mobile station UE is not in the discontinuous reception state, the determining unit determines whether to notify the measurement result in accordance with the radio quality in the measured serving cell and the peripheral cell and a parameter for the continuous reception state.

5 Claims, 3 Drawing Sheets

(56) References Cited

OTHER PUBLICATIONS

3GPP TS 36.213 V8.3.0, May 2008, "3rd Generation Partnership Project; Technical Specification Group Radio Access Network; Evolved Universal Terrestrial Radio Access (E-UTRA); Physical layer procedures (Release 8)," 45 pages.

3GPP TS 36.214 V8.3.0, May 2008, "3rd Generation Partnership Project; Technical Specification Group Radio Access Network; Evolved Universal Terrestrial Radio Access (E-UTRA); Physical layer—Measurements (Release 8)," 11 pages.

3GPP TS 36.300 V8.5.0, May 2008, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 134 pages.

International Search Report issued in PCT/JP2009/063374, mailed on Oct. 6, 2009, with translation, 3 pages.

Written Opinion issued in PCT/JP2009/063374, mailed on Oct. 6, 2009, with translation, 6 pages.

International Preliminary Report on Patentability issued in PCT/JP2009/063374, mailed on Oct. 6, 2009, with translation, 8 pages.

Office Action for Chinese Application No. 200980130630.8 dated Mar. 25, 2013, with English translation thereof (9 pages).

Official Action in the counterpart Chinese Patent application No. 200980130630.8 issued on Nov. 8, 2013 (9 pages).

\* cited by examiner

MOBILE STATION, RADIO BASE STATION, AND MOBILE COMMUNICATION METHOD

TECHNICAL FIELD

The present invention relates to a mobile station, a radio base station, and a mobile communication method.

BACKGROUND ART

In a mobile communication system including multiple cells, a mobile station UE (User Equipment: user device) is configured to continue communication by switching from the current cell to another cell when the mobile station moves from the current cell to the other cell. Such switching between cells is called "handover."

Generally, in a mobile communication system, when the mobile station UE moves to an adjacent cell, and the received power of signals from the adjacent cell at the mobile station UE becomes greater than the received power of signals from a Serving Cell, the mobile station UE performs a handover to the adjacent cell.

The received power of signals from the above-mentioned adjacent cell or the received power of signals from the serving cell is, for example, downlink RSRP (Reference Signal Received power) of downlink reference signals transmitted from the adjacent cell or the serving cell.

An example of the procedure of such handover is specifically described with reference to FIGS. 5 and 6.

As shown in FIG. 5, in step S1, the mobile station UE measures the received power of signals from the adjacent cell.

In step S2, the mobile station UE determines whether or not the received power of signals from the adjacent cell satisfies the following formula (Formula 1).

The received power of signals from the adjacent cell+ hysteresis>the received power of signals from the serving cell (Formula 1)

When it is determined that (Formula 1) is satisfied, in step S2, the mobile station UE notifies the network of an event A3 for reporting the above-mentioned measurement result.

Specifically, as shown in FIG. 6, the mobile station UE measures the received power of signals from the serving cell (cell A) and a peripheral cell (cell B) which are objects to be monitored, and determines whether or not the above-mentioned measurement result has to be notified by using "hysteresis [dB]" and "TTT (Time To Trigger) [ms]" which have been notified in advance.

That is to say, in FIG. 6, when the state in which the received power (radio quality) of signals from the cell B is greater than the received power (radio quality) of signals from the cell A by the "hysteresis" or more, continues for a predetermined time period of "TTT" or longer, the mobile station UE determines that the above-mentioned measurement result (Measurement Report) has to be notified.

As the received power (radio quality) of signals Fn, the values calculated by the following (Formula 2) and (Formula 3) are used. Specifically, in the mobile station UE, an upper layer is configured to perform the filtering processing (L3 Filtering) shown in (Formula 2) on the values measured by a physical layer.

$$Fn = (1-a) \cdot Fn-1 + a \cdot Mn \quad \text{(Formula 2)}$$

$$a = \frac{1}{2}(k/4) \quad \text{(Formula 3)}$$

where the value of "k" in (Formula 3) has been notified from the radio base station to the mobile station UE in advance like the "hysteresis" and "TTT." The "hysteresis" is a value provided to suppress frequent handover from the serving cell to the adjacent cell on the cell boundary, and may be a positive or negative value.

Further, in step S3, the network, when receiving a notification of the event A3, determines that the mobile station UE performs a handover to the cell according to the received event A3.

In a mobile communications system of the LTE (Long Term Evolution) scheme, DRX (Discontinuous Reception) control is applied.

Such discontinuous reception control is applied when the radio base station eNB and the mobile station UE are connected, and the data to be transmitted does not exist, and the mobile station UE in a discontinuous reception state is configured to receive a down control signal which is transmitted periodically, i.e., discontinuously via a PDCCH (Physical Downlink Control Channel).

In such a case, the mobile station UE only needs to receive discontinuously rather than continuously the down control signal transmitted via the physical downlink control channel PDCCH, thus the power consumption of a battery can be reduced.

More specifically, as shown in FIG. 7, the mobile station UE is configured to receive the down control signal transmitted via the physical downlink control channel PDCCH only in the reception duration (5 ms in the example of FIG. 7) provided every DRX period (1280 ms in the example of FIG. 7), and to turn other transmitters/receivers off. As a result, the power consumption of a battery can be reduced in the mobile station UE.

As described above, the mobile communication system of the LTE scheme controls whether each mobile station UE should be set in a discontinuous reception state or continuous reception state based on the existence of data to be transmitted, the above-described handover is performed regardless of whether or not the mobile station UE is in a discontinuous reception state.

SUMMARY OF THE INVENTION

Problem to be Solved by the Invention

As described above, in the mobile communication system of the LTE scheme, the discontinuous reception control is applied when the radio base station eNB and the mobile station UE are connected. That is to say, as the state of each mobile station UE, two types of state, a discontinuous reception state and a continuous reception state exist according to the presence of data to be transmitted.

The mobile station UE in a discontinuous reception state is generally configured to measure the peripheral cell only in the reception durations in the discontinuous reception control in order to maintain a battery saving effect achieved by the discontinuous reception control.

For example, in the case where the mobile station UE in a continuous reception state is configured to measure the peripheral cell for every 200 ms, the optimal value of "TTT" is assumed to be "640 ms."

However, in the case where the "DRX period" is set to "1280 ms", the mobile station UE in a discontinuous reception state is configured to measure the peripheral cell for every 1280 ms, thus the above-mentioned value "640 ms" for "TTT" has no meaning.

Now, the present invention has been made in view of the above-mentioned problems, and an object of the invention is to provide a mobile station, a radio base station, and a mobile communication method that enable measurement of the peripheral cell and an appropriate handover, when the discontinuous reception control is applied.

Means for Solving the Problems

A first feature of the present invention summarized as a mobile station configured to communicate with a radio base station, includes: a parameter acquisition unit configured to acquire a parameter for discontinuous reception state and a parameter for continuous reception state from the radio base station; a measuring unit configured to measure radio qualities in a serving cell and a peripheral cell of the mobile station; a determining unit configured to determine whether or not to notify the measurement result; and a notification unit configured to notify the radio base station of the measurement result when the determining unit determines the measurement result should be transmitted, wherein the determining unit is configured to determine whether or not to notify the measurement result based on the radio qualities in the serving cell and the peripheral cell, measured by the measuring unit, and the parameter for discontinuous reception state, acquired by the parameter acquisition unit, when the mobile station is in a discontinuous reception state, and the determining unit is configured to determine whether or not to notify the measurement result based on the radio qualities in the serving cell and the peripheral cell, measured by the measuring unit, and the parameter for continuous reception state, acquired by the parameter acquisition unit when the mobile station is not in a discontinuous reception state.

A second feature of the present invention summarized as a radio base station configured to communicate with a mobile station includes: a parameter notification unit configured to notify the mobile station of a parameter for discontinuous reception state and a parameter for continuous reception state; and a determining unit configured to determine whether or not the mobile station performs a handover based on a measurement result of radio qualities in a serving cell and a peripheral cell of the mobile station, notified by the mobile station, wherein when the mobile station is in a discontinuous reception state, the radio qualities in the serving cell and the peripheral cell of the mobile station are notified based on the radio qualities in the serving cell and the peripheral cell and the parameter for discontinuous reception state; and when the mobile station is not in a discontinuous reception state, the radio qualities in the serving cell and the peripheral cell of the mobile station are notified based on the radio qualities in the serving cell and the peripheral cell and the parameter for continuous reception state.

A third feature of the present invention summarized as a mobile communication method for communicating between a radio base station and a mobile station, the mobile communication method includes: a step A of notifying, by the radio base station, the mobile station of a parameter for discontinuous reception state and a parameter for continuous reception state; a step B of measuring, by the mobile station, radio qualities in a serving cell and a peripheral cell of the mobile station; a step C in which the mobile station determines whether or not to notify the measurement result; a step D of notifying, by the mobile station, the radio base station of the measurement result when it is determined to notify the measurement result; and a step E of determining, by the radio base station, whether or not the mobile station performs a handover based on the measurement result of the radio qualities in the serving cell and the peripheral cell of the mobile station, notified by the mobile station, wherein in the step C, when in a discontinuous reception state, the mobile station determines whether or not to notify the measurement result based on the measured radio qualities in the serving cell and the peripheral cell and the acquired parameter for discontinuous reception state; and in the step C, when not in a discontinuous reception state, the mobile station determines whether or not to notify the measurement result based on the measured radio qualities in the serving cell and the peripheral cell and the acquired parameter for continuous reception state.

Effect of the Invention

As described above, according to the present invention, provided are the mobile station, the radio base station and the mobile communication that enable measurement of the peripheral cell and an appropriate handover, when the discontinuous reception control is applied.

EMBODIMENTS FOR CARRYING OUT THE INVENTION (Configuration of Mobile Communication System According to First Embodiment of Present Invention)

The configuration of a mobile communication system according to the first embodiment of the present invention is described with reference to FIGS. 1 to 3.

Figure 1:
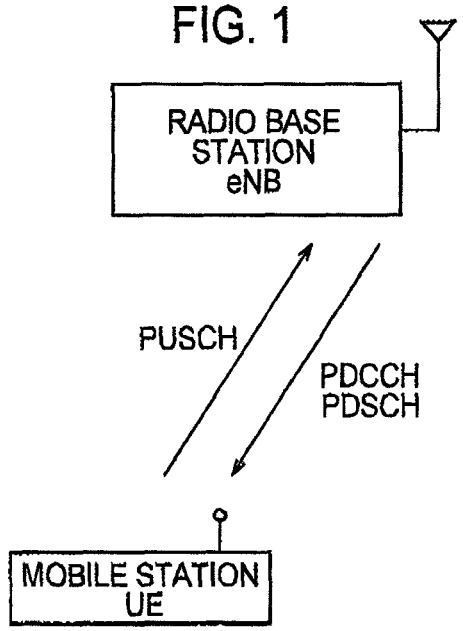
FIG. 1 is the overall configuration diagram of a mobile communication system according to a first embodiment of the present invention.

As shown in FIG. 1, the mobile communication system according to the present embodiment is a mobile communication system of the LTE scheme. In such a mobile communication system, application of "OFDM (Orthogonal Frequency Division Multiplexing) scheme" as the radio access scheme to a downlink, and application of "SC-FDMA (Single-Carrier Frequency Division Multiple Access) scheme" as the radio access scheme to an uplink are being reviewed.

The OFDM scheme is a scheme in which a specific frequency band is divided into multiple narrower frequency bands (subcarriers), and data is transmitted by placing data on each narrower frequency band. According to the OFDM system, high-speed transmission can be achieved and utilization efficiency of frequency can be increased by densely arranging the subcarriers without interfering with each other while allowing the subcarriers to be partially overlapped.

Also, the SC-FDMA scheme is a transmission scheme in which interference between multiple mobile stations UE can be reduced by dividing a specific frequency band into frequency bands and performing transmission using the different frequency bands for multiple mobile stations UE. According to the SC-FDMA scheme, variation in transmission power tends to be reduced, thus lower power consumption and a wider coverage for the mobile station UE can be achieved.

Also, in the mobile communication system according to the present embodiment, the radio base station eNB is configured to transmit a down control signal via the physical down control channel PDCCH, and to transmit a down data signal via a Physical Downlink Shared Channel PDSCH.

On the other hand, in the mobile communication system according to the present embodiment, the mobile station UE is configured to transmit a data signal via a Physical Uplink Shared Channel PUSCH.

Figure 2:
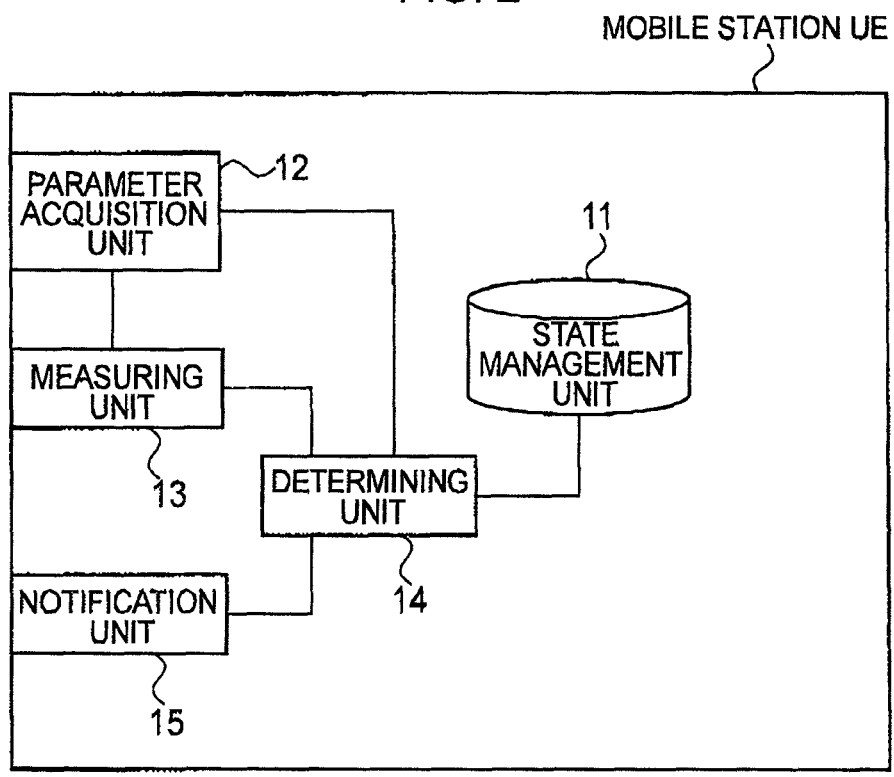
FIG. 2 is a functional block diagram of a mobile station according to the first embodiment of the present invention.

As shown in FIG. 2, the mobile station UE includes a state management unit 11, a parameter acquisition unit 12, a measuring unit 13, a determining unit 14, and a notification unit 15.

The state management unit 11 is configured to manage to check whether or not the mobile station UE is in a discontinuous reception state.

The parameter acquisition unit 12 is configured to acquire a parameter for discontinuous reception state and a parameter for continuous reception state from the radio base station eNB.

The measuring unit 13 is configured to measure radio qualities in the serving cell and the peripheral cell of the mobile station UE.

For example, the measuring unit 13 may be configured to measure signals (for example, RS (Reference Signal)) as the radio qualities in the serving cell and the peripheral cell of the mobile station UE, from the serving cell and the peripheral cell of the mobile station UE. The received power of such a reference signal may be referred to as "RSRP (Reference Signal Received Power)."

Also, the measuring unit 13 may set a value calculated by the above-mentioned (Formula 2) and (Formula 3) as the measurement value of the received power Fn of signals from the serving cell and the peripheral cell of the mobile station UE. For example, the measurement interval in the physical layer is 200 ms.

The determining unit 14 is configured to determine whether or not to notify the measurement result (Measurement Report) obtained by the above-described measuring unit 13.

For example, the determining unit 14 may be configured to determine to notify the above-described measurement result when a predetermined condition is satisfied continuously for a predetermined time period or longer. The determining unit 14 may use the predetermined condition as the condition for the above-mentioned (Formula 1).

The parameters for the discontinuous reception state and the parameters for the continuous reception state each include a first parameter ("TTT") indicating the above-mentioned predetermined time period, and a second parameter ("hysteresis" and "k (filter factor)") specifying the above-mentioned predetermined condition.

Now, examples of a parameter for discontinuous reception state ("TTT", "hysteresis", and "k (filter factor)") and a parameter for continuous reception state ("TTT", "hysteresis", and "k (filter factor)") are shown.

TABLE 1

|  | TTT (s) | HYSTERESIS (dB) | K (FILTER FACTOR) |
|---|---|---|---|
| PARAMETER FOR DISCONTINUOUS RECEPTION STATE | 0.64 | 3 | 8 |
| PARAMETER FOR CONTINUOUS RECEPTION STATE | 2.56 | 2 | 4 |

As seen from the example the mobile communications system according to the present embodiment is configured to have different values for the parameter for discontinuous reception state and the parameter for continuous reception state.

For example, the value of the first parameter (2560 [ms]) of the parameters for the discontinuous reception state may be defined to be longer than the value of the first parameter (640 [ms]) in the parameters for continuous reception state and the DRX period (1280 [ms]).

In the following, the effect of defining the value of the first parameter (2560 [ms]) in the parameters for the discontinuous reception state to be longer than the value of the first parameter (640 [ms]) in the parameters for continuous reception state and the DRX period (1280 [ms]) is described.

Because measurement frequency in a discontinuous reception state is reduced compared with measurement frequency in a continuous reception state, accordingly the time period for a determination needs to be increased in order to obtain a sufficient number of samples needed for the determination.

Thus, as described above, by defining the value of the first parameter (2560 [ms]) in the parameters for the discontinuous reception state to be longer than the value of the first parameter (640 [ms]) in the parameters for continuous reception state and the DRX period (1280 [ms]), an appropriate determination can be made in a discontinuous reception state.

The value of the second parameter in the parameters for the discontinuous reception state may be defined to be smaller than the value of the second parameter in the parameters for the continuous reception state.

That is to say, the value of the hysteresis in the parameters for the discontinuous reception state may be defined to be smaller than the value of the hysteresis in the parameters for the continuous reception state. Alternatively, the value of the filter factor in the parameters for the discontinuous reception state may be defined to be smaller than the value of the filter factor in the parameters for the continuous reception state.

The relationship between the value of the first parameter in the parameters for the discontinuous reception state and the value of the first parameter in the parameters for the continuous reception state described above is an example, and the relationship may be reversed, or the both values may be the same.

Also, the relationship between the value of the second parameter in the parameters for the discontinuous reception state and the value of the second parameter in the parameters for the continuous reception state described above is an example, and the relationship may be reversed, or the both values may be the same.

For example, the hysteresis (3 dB) in the parameters for the discontinuous reception state may be defined to be the same as the hysteresis (3 dB) in the parameters for the continuous reception state.

Alternatively, the filter factor (4) in the parameters for the discontinuous reception state may be defined to be smaller than the filter factor (8) in the parameters for the continuous reception state.

Because measurement frequency in a discontinuous reception state is reduced compared with measurement frequency in a continuous reception state, extreme equalization may be made based on the filter factor. In this case, by making the filter factor (4) in the parameters for the discontinuous reception state smaller than the filter factor (8) in the parameters for the continuous reception state, an influence of the equalization in one measurement is reduced, thus more appropriate measurement can be made in a discontinuous reception state.

When the mobile station UE is in a discontinuous reception state, the determining unit 14 is configured to determine whether or not to notify the above-described measurement result based on the radio quality in the serving cell and the peripheral cell, measured by the measuring unit 13, and the parameter for discontinuous reception state, acquired by the parameter acquisition unit 12.

On the other hand, when the mobile station UE is not in a discontinuous reception state, the determining unit 14 is configured to determine whether or not to notify the above-described measurement result based on the radio qualities in the serving cell and the peripheral cell, measured by the measuring unit 13, and the parameter for continuous reception state, acquired by the parameter acquisition unit 12.

The notification unit 15 is configured to notify the radio base station eNB of a measurement result when it is determined by the determining unit 14 that the measurement result should be transmitted.

Specifically, the notification unit 15 is configured to notify the radio base station eNB of the measurement result via the physical uplink shared channel, PUSCH. Such measurement result may be referred to as "Measurement Report."

Figure 3:
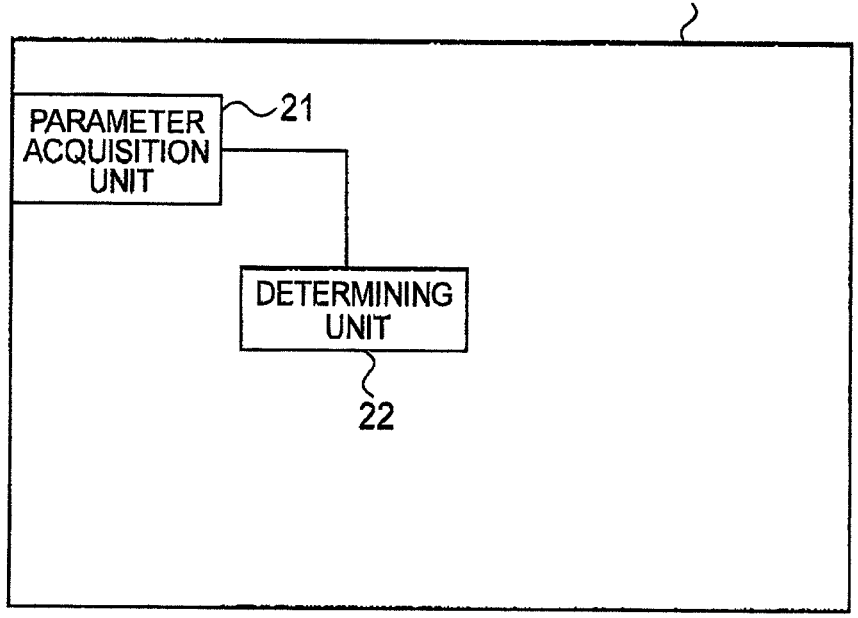
FIG. 3 is a functional block diagram of a radio base station according to the first embodiment of the present invention.

As shown in FIG. 3, the radio base station eNB includes a parameter notification unit 21 and a determining unit 22.

The parameter notification unit 21 is configured to notify the mobile station UE of the above-described parameters for the discontinuous reception state and the parameters for the continuous reception state.

Specifically, the parameter notification unit 21 is configured to notify the mobile station UE of the above-described parameters for the discontinuous reception state and the parameters for the continuous reception state via the physical downlink shared channel PDSCH.

The parameters for the discontinuous reception state and the parameters for the continuous reception state may be notified to the mobile station UE as broadcast information, or may be notified to the mobile station UE as "RRC Message", which is individual control information.

The determining unit 22 is configured to determine whether or not the mobile station UE performs a handover based on the measurement result of the radio qualities in the serving cell and the peripheral cell of the mobile station UE, notified by the mobile station UE.

(Operation of Mobile Communication System According to First Embodiment of Present Invention)

The operation of the mobile communication system according to the first embodiment of the present invention, specifically the operation of notification of the above-described measurement result by the mobile station UE according to the first embodiment of the present invention is described with reference to FIG. 4.

Figure 4:
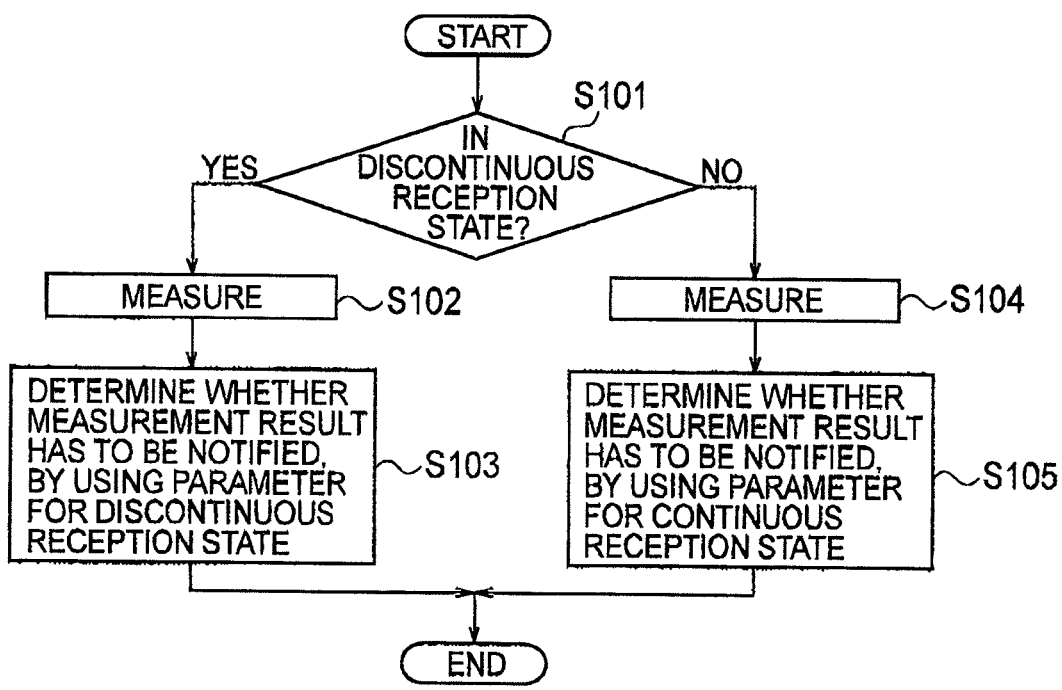
FIG. 4 is a flowchart showing the operation of the mobile station according to the first embodiment of the present invention.
Figure 5:
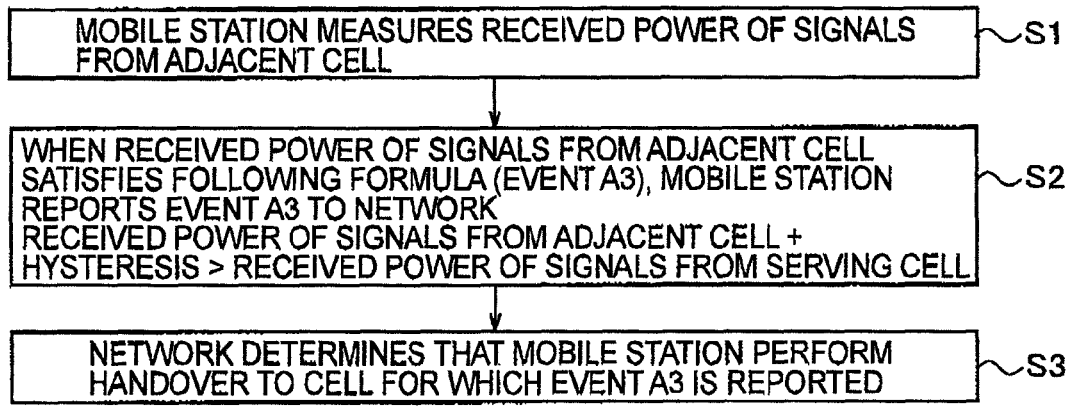
FIG. 5 is a flowchart showing a common operation of a handover.
Figure 6:
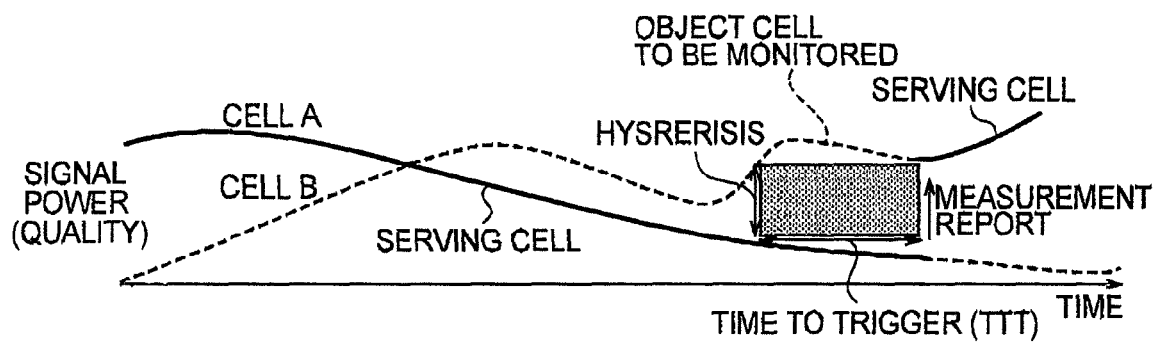
FIG. 6 is a diagram for illustrating a notification method for a common measurement report.
Figure 7:
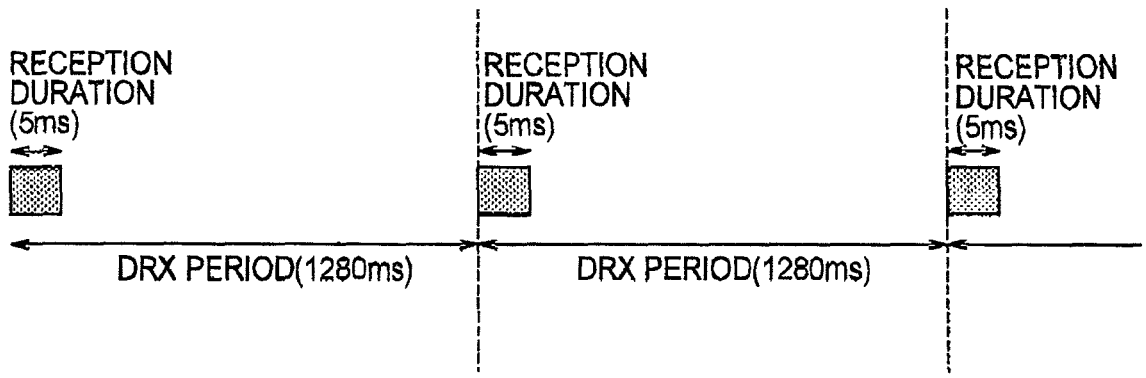
FIG. 7 is a diagram for illustrating a common operation of a mobile station in a discontinuous reception state.

As shown in FIG. 4, in step S101, it is determined whether or not the mobile station UE is in a discontinuous reception state.

When it is determined that the mobile station UE is in a discontinuous reception state, in step S102 the mobile station UE measures the radio qualities in the serving cell and the peripheral cell.

In step S103, the mobile station UE determines whether or not the above-mentioned measurement result has to be notified to the radio base station eNB, based on the parameters for the discontinuous reception state (the first parameter and the second parameter), and the measured radio qualities in the serving cell and the peripheral cell.

For example, the mobile station UE, when determining that the following (Formula 4) to (Formula 6) are satisfied continuously for "2.56 [s]", determines that the above-mentioned measurement result has to be notified to the radio base station eNB.

The received power $Fn$ of signals from the adjacent cell+2 [dB]>the received power of signals from the serving cell    (Formula 4)

$Fn = (1-a) \cdot Fn-1 + a \cdot Mn$    (Formula 5)

$a = \frac{1}{2}$    (Formula 6)

where the values of the parameters for the discontinuous reception state (the first parameter and the second parameter) are those values listed in Table 1.

When it is determined that the mobile station UE is in a continuous reception state, in step S104 the mobile station UE measures the radio qualities in the serving cell and the peripheral cell.

In step S105, the mobile station UE determines whether or not the above-mentioned measurement result has to be notified to the radio base station eNB, based on the parameters for the continuous reception state (the first parameter and the second parameter), and the measured radio qualities in the serving cell and the peripheral cell.

For example, the mobile station UE, when determining that the following (Formula 7) to (Formula 9) are satisfied continuously for "0.64 [s]", determines that the above-mentioned measurement result has to be notified to the radio base station eNB.

The received power Fn of signals from the adjacent cell+3 [dB]>the received power of signals from the serving cell    (Formula 7)

$Fn = (1-a) \cdot Fn-1 + a \cdot Mn$    (Formula 8)

$a = \frac{1}{22}$    (Formula 9)

where the values of the parameters for the continuous reception state (the first parameter and the second parameter) are those values listed in Table 1.

In the first embodiment described above, two types of state, i.e., a discontinuous reception state and a continuous reception state exist, however, alternatively, when three types of states: a long discontinuous reception state, a short discontinuous reception state, and a continuous reception state exist, the mobile station, the radio base station, and the mobile communication method according to the present invention may be applied.

For example, when three types of states: a long discontinuous reception state, a short discontinuous reception state, and a continuous reception state exist, as the first parameter and the second parameter, three types of parameter: the parameter for the long discontinuous reception state, the parameter for the short discontinuous reception state, and the parameter for continuous reception state are defined. In each state, respective parameters may be applied.

Alternatively, when three types of states: a long discontinuous reception state, a short discontinuous reception state, and a continuous reception state exist, two types of parameters: the parameter for discontinuous reception state, and the parameter for continuous reception state may be defined so that the parameter for discontinuous reception state is applied in a long discontinuous reception state and a short discontinuous reception state, and the parameter for the continuous reception state may be applied in a continuous reception state.

Also, in the first embodiment described above, the reference signal received power (RSRP) has been used as the radio qualities in the serving cell and the peripheral cell, however, RSRQ, RS-SIR, or CQI may be used instead. Alternatively, at least one of RSRP, RSRQ, RS-SIR, and CQI may be used as the radio qualities in the serving cell and the peripheral cell.

The RSRQ (Reference Signal Received Quality Power) is the value obtained by dividing the downlink reference signal received power by the downlink RSSI (Received Signal Strength Indicator).

RSSI is the total received levels observed in a mobile station, and includes all of the interference power from thermal noise or other cells, and electric power of desired signals from the current cell (refer 3GPP TS36.214 V8.3.0 for the definition of RSRQ).

Also, RS-SIR is SIR (Signal-to-Interference Ratio) of the downlink reference signal.

Also, CQI (Channel Quality Indicator) is downlink radio quality information (refer 3GPP TS36.213 V8.3.0 for the definition of CQI).

Also, in the first embodiment described above, two types of parameters: the parameter for discontinuous reception state, and the parameter for continuous reception state are defined for the TTT, the hysteresis, and the filter factor, however, alternatively, for a part of the TTT, the hysteresis, and the filter factor, two types of parameters: the parameter for discontinuous reception state, and the parameter for continuous reception state may be defined.

For example, only for the TTT and the filter factor out of the TTT, the hysteresis, and the filter factor, two types of parameters: the parameter for discontinuous reception state, and the parameter for continuous reception state may be defined.

(Operations and Effects of Mobile Communication System According to First Embodiment of Present Invention)

According to the mobile communication system according to the first embodiment of the present invention, the values of the parameter for discontinuous reception state, and the parameter for continuous reception state can be changed depending on the DRX cycle, thus the mobile station UE can notify the network of a measurement result in an appropriate timing, and can continue the communication without causing a communication interruption, so that a load on the network and the consumed electric current of the mobile station UE can be suppressed, and furthermore, the user convenience can be improved.

Modification Example

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile station configured to communicate with a radio base station, comprising:
   a parameter acquisition unit configured to acquire a parameter for discontinuous reception state and a parameter for continuous reception state from the radio base station;
   a measuring unit configured to measure a measurement result of radio qualities in a serving cell and a peripheral cell of the mobile station;
   a determining unit configured to determine whether or not to notify the measurement result; and
   a notification unit configured to notify the radio base station of the measurement result when the determining unit determines the measurement result should be transmitted,
   wherein the determining unit is configured to determine whether or not to notify the measurement result based on the radio qualities in the serving cell and the peripheral cell, measured by the measuring unit, and the parameter for discontinuous reception state, acquired by the parameter acquisition unit, when the mobile station is in a discontinuous reception state, and
   the determining unit is configured to determine whether or not to notify the measurement result based on the radio qualities in the serving cell and the peripheral cell, measured by the measuring unit, and the parameter for continuous reception state, acquired by the parameter acquisition unit when the mobile station is not in the discontinuous reception state,
   wherein the mobile station determining unit determines to notify a measurement result when a predetermined condition is satisfied continuously for a predetermined time period or longer,
   the parameter for discontinuous reception state and the parameter for continuous reception state each include a first parameter indicating the predetermined time period,
   a value of the first parameter included in the parameter for discontinuous reception state is longer than the value of the first parameter included in the parameter for continuous reception state and is also longer than a discontinuous reception cycle, and
   a value of hysteresis in the parameter for the discontinuous reception state is defined to be smaller than a value of hysteresis in the parameters for the continuous reception state.

2. The mobile station according to claim 1, wherein
   the determining unit is configured to determine to notify the measurement result when the predetermined condition is satisfied continuously for the predetermined time period or longer; and the parameter for discontinuous reception state and the parameter for continuous reception state each include a second parameter which specifies the predetermined time period.

3. A radio base station configured to communicate with a mobile station comprising:
- a parameter notification unit configured to notify the mobile station of a parameter for discontinuous reception state and a parameter for continuous reception state; and
- a determining unit configured to determine whether or not the mobile station performs a handover based on a measurement result of radio qualities in a serving cell and a peripheral cell of the mobile station, notified by the mobile station,
- wherein when the mobile station is in a discontinuous reception state, the radio qualities in the serving cell and the peripheral cell of the mobile station are notified based on the radio qualities in the serving cell and the peripheral cell and the parameter for discontinuous reception state; and
- when the mobile station is not in the discontinuous reception state, the radio qualities in the serving cell and the peripheral cell of the mobile station are notified based on the radio qualities in the serving cell and the peripheral cell and the parameter for continuous reception state,
- wherein the mobile station determining unit determines to notify the measurement result when a predetermined condition is satisfied continuously for a predetermined time period or longer,
- the parameter for discontinuous reception state and the parameter for continuous reception state each include a first parameter indicating a predetermined time period,
- a value of the first parameter included in the parameter for discontinuous reception state is longer than the value of the first parameter included in the parameter for continuous reception state and longer than a discontinuous reception cycle, and
- a value of hysteresis in the parameter for the discontinuous reception state is defined to be smaller than a value of hysteresis in the parameters for the continuous reception state.

4. The radio base station according to claim 3, wherein the parameter for discontinuous reception state and the parameter for continuous reception state each include a second parameter which specifies the predetermined time period.

5. A mobile communication method for communicating between a radio base station and a mobile station, the mobile communication method including:
- a step A of notifying, by the radio base station, the mobile station of a parameter for discontinuous reception state and a parameter for continuous reception state;
- a step B of measuring, by the mobile station, a measurement result of radio qualities in a serving cell and a peripheral cell of the mobile station;
- a step C in which the mobile station determines whether or not to notify the measurement result;
- a step D of notifying, by the mobile station, the radio base station of the measurement result when it is determined to notify the measurement result; and
- a step E of determining, by the radio base station, whether or not the mobile station performs a handover based on the measurement result of the radio qualities in the serving cell and the peripheral cell of the mobile station, notified by the mobile station,
- wherein in the step C, when in a discontinuous reception state, the mobile station determines whether or not to notify the measurement result based on the measured radio qualities in the serving cell and the peripheral cell and the acquired parameter for discontinuous reception state; and
- in the step C, when not in the discontinuous reception state, the mobile station determines whether or not to notify the measurement result based on the measured radio qualities in the serving cell and the peripheral cell and the acquired parameter for continuous reception state,
- wherein in the step C, the mobile station determining unit determines to notify the measurement result when a predetermined condition is satisfied continuously for a predetermined time period or longer,
- the parameter for discontinuous reception state and the parameter for continuous reception state each include a first parameter indicating a predetermined time period,
- a value of the first parameter included in the parameter for discontinuous reception state is longer than the value of the first parameter included in the parameter for continuous reception state and longer than a discontinuous reception cycle, and
- a value of hysteresis in the parameter for the discontinuous reception state is defined to be smaller than a value of hysteresis in the parameters for the continuous reception state.

* * * * *